(12) United States Patent
Ogawa et al.

(10) Patent No.: US 11,131,325 B2
(45) Date of Patent: Sep. 28, 2021

(54) VIBRATION SUPPRESSING METHOD FOR SUPERCHARGER, AND SUPERCHARGER

(71) Applicant: MITSUBISHI HEAVY INDUSTRIES ENGINE & TURBOCHARGER, LTD., Sagamihara (JP)

(72) Inventors: Shinji Ogawa, Tokyo (JP); Naoyuki Nagai, Tokyo (JP); Yosuke Danmoto, Sagamihara (JP); Tomoaki Takeshita, Tokyo (JP); Hiroyuki Hosoya, Tokyo (JP); Takaya Futae, Tokyo (JP)

(73) Assignee: MITSUBISHI HEAVY INDUSTRIES ENGINE & TURBOCHARGER, LTD., Sagamihara (JP)

( * ) Notice: Subject to any disclaimer, the term of this patent is extended or adjusted under 35 U.S.C. 154(b) by 56 days.

(21) Appl. No.: 16/610,407

(22) PCT Filed: Nov. 24, 2017

(86) PCT No.: PCT/JP2017/042158
§ 371 (c)(1),
(2) Date: Nov. 1, 2019

(87) PCT Pub. No.: WO2019/102576
PCT Pub. Date: May 31, 2019

(65) Prior Publication Data
US 2020/0182261 A1 Jun. 11, 2020

(51) Int. Cl.
*F04D 29/66* (2006.01)
*F01D 25/04* (2006.01)
(Continued)

(52) U.S. Cl.
CPC ........... *F04D 29/668* (2013.01); *F01D 25/04* (2013.01); *F01D 25/24* (2013.01); *G01H 13/00* (2013.01);
(Continued)

(58) Field of Classification Search
CPC ........ F01D 25/04; F01D 25/24; F04D 29/668; F02C 6/12; F02C 7/06; F02B 39/00;
(Continued)

(56) References Cited

U.S. PATENT DOCUMENTS 5,501,075 A * 3/1996 Spies ............... F02M 35/10321
60/605.1
5,624,099 A * 4/1997 Spies ............... F02M 35/10321
248/562
(Continued)

FOREIGN PATENT DOCUMENTS

CN 102338158 A 2/2012
CN 105874255 A 8/2016
(Continued)

OTHER PUBLICATIONS

Extended European Search Report, dated Mar. 10, 2020, for European Application No. 17932996.6.
(Continued)

*Primary Examiner* — Igor Kershteyn
(74) *Attorney, Agent, or Firm* — Birch, Stewart, Kolasch & Birch, LLP

(57) ABSTRACT

Provided is a vibration suppressing method for a supercharger, the supercharger including a shaft, a wheel arranged at one end or the other end of the shaft, and a housing including a wheel cover accommodating the wheel; the method including a determining step of determining a suppression target oscillation frequency to be a suppression target from among oscillation frequencies of the housing vibrating with shaft vibration of the shaft transmitted thereto, a preparing step of preparing a vibration suppressing unit having a natural frequency to be tuned in to the suppression target oscillation frequency, and an attaching (Continued)

step of attaching the vibration suppressing unit prepared in the preparing step onto an outer face of the housing.

10 Claims, 13 Drawing Sheets

(51) Int. Cl.
*F01D 25/24* (2006.01)
*G01H 13/00* (2006.01)

(52) U.S. Cl.
CPC ...... *F05D 2220/40* (2013.01); *F05D 2260/96* (2013.01)

(58) Field of Classification Search
CPC ..... F02B 39/16; G01H 13/00; F05D 2220/40; F05D 2260/96
See application file for complete search history.

(56) References Cited

U.S. PATENT DOCUMENTS

| | | |
|---|---|---|
| 6,439,359 B1 | 8/2002 | Kato et al. |
| 2007/0151242 A1 | 7/2007 | Trondle et al. |
| 2009/0297331 A1 | 12/2009 | Caucheteux et al. |
| 2013/0220285 A1 | 8/2013 | Hayashi et al. |
| 2016/0326905 A1 | 11/2016 | Zhang et al. |
| 2017/0191377 A1* | 7/2017 | Longacre ................ F16C 27/08 |

FOREIGN PATENT DOCUMENTS

| | | |
|---|---|---|
| DE | 102012109807 A1 | 4/2014 |
| JP | 57-109347 U | 7/1982 |
| JP | 60-171934 U | 11/1985 |
| JP | 2002-81494 A | 3/2002 |
| JP | 2007-285377 A | 11/2007 |
| JP | 2008-501881 A | 1/2008 |
| JP | 2009-264382 A | 11/2009 |
| JP | 2010-156280 A | 7/2010 |
| JP | 2013-7350 A | 1/2013 |
| WO | WO 00/14429 A1 | 3/2000 |
| WO | WO 2012/063603 A1 | 5/2012 |
| WO | WO 2012/066644 A1 | 5/2012 |

OTHER PUBLICATIONS

International Preliminary Report on Patentability and Written Opinion of the International Searching Authority with an English translation, dated Jun. 4, 2020, for International Application No. PCT/JP2017/042158.
International Search Report, dated Jan. 23, 2018, for International Application No. PCT/JP2017/042158.
Japanese Office Action, dated Jun. 23, 2020, for Japanese Application No. 2019-556042, with an English machine translation.
Chinese Office Action and Search Report, dated Jan. 26, 2021, for Chinese Application No. 201780089799.8.

* cited by examiner

VIBRATION SUPPRESSING METHOD FOR SUPERCHARGER, AND SUPERCHARGER

TECHNICAL FIELD

This invention relates to a vibration suppressing method for a supercharger, and a supercharger.

BACKGROUND

A supercharger is to supply (supercharge) gas such as air to an engine (internal combustion engine) as compressing the gas by a compressor for improving power of the engine. Examples of a supercharger include an exhaust turbine turbocharger, a turbine of which is to be driven with energy of exhaust gas of an engine, a mechanical supercharger to be driven by an engine, and an electric compressor to be driven with an electric motor serving as a main power source or a subsidiary power source.

Since a supercharger includes a shaft as a rotor to rotate a turbine or a compressor, there arises a problem that high-speed rotation of the shaft causes vibration and noise. In some cases, shaft vibration of a shaft is suppressed by arranging a damper unit at the shaft to solve such a problem (e.g., Patent Documents 1 and 2).

CITATION LIST

Patent Literature

Patent Document 1: WO2012/63603A
Patent Document 2: WO2012/66644A

SUMMARY

Technical Problem

According to Patent Documents 1 and 2, it is possible to suppress shaft vibration of the shaft by the damper device. However, arranging the damper device at the shaft causes complicated configuration and a fear of yield degradation due to increased working time for assembling operation. In some cases, balancing to cut a part of the shaft or a wheel is performed so that shaft vibration of the shaft stays in an allowable value range. However, in this case, inspection operation becomes complicated and yield degradation occurs.

In this regard, it is an object of at least one embodiment of the present invention to provide a vibration suppressing method for a supercharger, and a supercharger, capable of actualizing lowing noise while suppressing vibration of a housing with a simple way.

Solution to Problem (1) A vibration suppressing method for a supercharger according to at least one of embodiments of the present invention, the supercharger including a shaft, a wheel arranged at one end or the other end of the shaft, and a housing including a wheel cover accommodating the wheel; includes a determining step of determining a suppression target oscillation frequency to be a suppression target from among oscillation frequencies of the housing vibrating with shaft vibration of the shaft transmitted thereto, a preparing step of preparing a vibration suppressing unit having a natural frequency to be tuned in to the suppression target oscillation frequency, and an attaching step of attaching the vibration suppressing unit prepared in the preparing step onto an outer face of the housing.

According to the method described above as (1), since the supercharger as the vibration suppression target of the vibration suppressing method includes the shaft, the wheel arranged at one end or the other end of the shaft, and the housing including the wheel cover accommodating the wheel, the housing vibrates during rotation of the shaft with shaft vibration of the shaft transmitted thereto. As a measure for the above, the vibration suppressing method for a supercharger according to at least one of embodiments of the present invention includes the determining step of determining the suppression target oscillation frequency to be a suppression target from among oscillation frequencies of the housing, the preparing step of preparing the vibration suppressing unit having a natural frequency to be tuned in to the suppression target oscillation frequency, and the attaching step of attaching the vibration suppressing unit prepared in the preparing step onto the outer face of the housing. Thus, since the vibration suppressing unit attached onto the outer face of the housing through the preparing step and the attaching step has a natural frequency to be tuned in to the suppression target oscillation frequency of the housing, the vibration suppressing unit vibrates instead while absorbing vibration of the housing at the suppression target oscillation frequency. Accordingly, it is possible to actualize lowering noise of the supercharger while suppressing vibration of the housing.

(2) In some embodiments, in the method described above as (1), the vibration suppressing unit includes a dynamic damper device including at least one damper member to be attached onto the outer face of the housing, the damper member being extended in a direction away from the housing and having a natural frequency to be tuned in to vibration of the housing.

According to the method described above as (2), vibration of the housing can be suppressed by preparing, in the preparing step, the dynamic damper device including at least one damper member having a natural frequency to be tuned in to vibration of the housing, and attaching, in the attaching step, the dynamic damper device onto the outer face of the housing. Further, since the damper member is attached onto the outer face of the housing, ease of assembling is enhanced.

(3) In some embodiments, in the method described above as (1), the vibration suppressing unit includes an actuator attached onto the outer face of the housing with a bolt.

According to the method described above as (3), owing to that the actuator having a natural frequency to be tuned in to vibration of the housing is prepared in the preparing step and the actuator is attached onto the outer face of the housing with the bolt in the attaching step, vibration of the housing can be suppressed. Further, being different from the dynamic damper device, the actuator is not a component additionally attached to the housing, so that increase in part count of the supercharger can be prevented.

(4) In some embodiments, in the method described above as (1), the vibration suppressing unit includes a piping joint attached to a connection section between the housing and a connecting pipe to be connected to the housing.

According to the method described above as (4), owing to that the piping joint having a natural frequency to be tuned in to vibration of the housing is prepared in the preparing step and the piping joint is attached to the connection section between the housing and the connecting pipe in the attaching step, vibration of the housing can be suppressed. Further, being different from the dynamic damper device, the piping joint is not a component additionally attached to the housing, so that increase in part count of the supercharger can be prevented.

(5) In some embodiments, in the method described above as any one of (1) to (4), the wheel includes a compressor wheel arranged at the one end of the shaft, the wheel cover includes a compressor cover accommodating the compressor wheel, the housing further includes a bearing cover accommodating a bearing rotatably supporting the shaft, and the vibration suppressing unit is attached onto an outer face of the compressor cover.

According to the method described above as (5), since the shaft is rotatably supported by the bearing, the shaft rotationally swings, during rotation of the shaft, more at the end thereof where the compressor wheel is arranged than a section thereof supported by the bearing. Accordingly, the compressor cover accommodating the compressor wheel is to vibrate more than the bearing cover accommodating the bearing. Here, owing to that the vibration suppressing unit is attached onto the outer face of the compressor cover, vibration of the housing can be effectively suppressed.

(6) In some embodiments, in the method described above as (5), the wheel includes a turbine wheel arranged at the other end of the shaft, and the wheel cover includes a turbine cover accommodating the turbine wheel.

According to the method described above as (6), the supercharger as a vibration suppression target is a turbocharger including the compressor wheel and the turbine wheel. Since the compressor wheel is lighter than the turbine wheel in a turbocharger, the shaft supported by the bearing rotationally swings, during rotation thereof, more on the compressor wheel side than on the turbine wheel side. Accordingly, the compressor cover accommodating the compressor wheel is to vibrate more than the turbine cover accommodating the turbine wheel. Here, owing to that the vibration suppressing unit is attached onto the outer face of the compressor cover, vibration of the housing can be effectively suppressed.

(7) A supercharger according to at least one of embodiments of the present invention includes a shaft, a wheel arranged at one end or the other end of the shaft, a housing including a wheel cover accommodating the wheel, and a dynamic damper device including at least one damper member to be attached onto an outer face of the housing, the damper member being extended in a direction away from the housing and having a natural frequency to be tuned in to vibration of the housing.

According to the configuration described above as (7), since the supercharger includes the shaft, the wheel arranged at one end or the other end of the shaft, and the housing including the wheel cover accommodating the wheel, the housing vibrates during rotation of the shaft with shaft vibration of the shaft transmitted thereto. As a measure for the above, the supercharger includes the dynamic damper device including the at least one damper member to be attached onto the outer face of the housing. The at least one damper member of the dynamic damper device is extended in a direction away from the housing and has a natural frequency to be tuned in to vibration of the housing. Thus, since the damper member attached onto the outer face of the housing has a natural frequency to be tuned in to the vibration of the housing, the damper member vibrates instead while absorbing vibration of the housing. Accordingly, it is possible to actualize lowering noise of the supercharger while suppressing vibration of the housing. Further, since the damper member is attached onto the outer face of the housing, ease of assembling is enhanced.

(8) In some embodiments, in the configuration described above as (7), the dynamic damper device includes a plurality of the damper members, and the damper members have natural frequencies respectively different from one another.

According to the configuration described above as (8), since the dynamic damper device can cause the damper members each having different natural frequencies to be tuned in respectively to a plurality of oscillation frequencies of the housing, vibration of the housing can be effectively suppressed.

(9) In some embodiments, in the configuration described above as (7) or (8), the dynamic damper device further includes a plate-shaped elastic member attached to the at least one damper member in a removably attachable manner.

According to the configuration described above as (9), the natural frequency of the damper member can be easily adjusted by changing the elastic member to be attached to the damper member with another elastic member having different dimensions, shapes, and the like.

(10) In some embodiments, in the configuration described above as any one of (7) to (9), the wheel includes a compressor wheel arranged at the one end of the shaft, the wheel cover includes a compressor cover accommodating the compressor wheel, the housing further includes a bearing cover accommodating a bearing rotatably supporting the shaft, and the dynamic damper device is attached onto an outer face of the compressor cover.

According to the configuration described above as (10), since the shaft is rotatably supported by the bearing, the shaft rotationally swings, during rotation of the shaft, more at the end thereof where the compressor wheel is arranged than a section thereof supported by the bearing. Accordingly, the compressor cover accommodating the compressor wheel is to vibrate more than the bearing cover accommodating the hearing. Here, owing to that the dynamic damper device is attached onto the outer face of the compressor cover, vibration of the housing can be effectively suppressed.

(11) In some embodiments, in the configuration described above as (10), the wheel includes a turbine wheel arranged at the other end of the shaft and the wheel cover includes a turbine cover accommodating the turbine wheel.

According to the configuration described above as (11), the supercharger is a turbocharger including the compressor wheel and the turbine wheel. Since the compressor wheel is lighter than the turbine wheel in such a turbocharger, the shaft supported by the bearing rotationally swings, during rotation thereof, more on the compressor wheel side than on the turbine wheel side. Accordingly, the compressor cover accommodating the compressor wheel is to vibrate more than the turbine cover accommodating the turbine wheel. Here, owing to that the dynamic damper device is attached onto the outer face of the compressor cover, vibration of the housing can be effectively suppressed.

Advantageous Effects

At least one embodiment of the present invention provides a vibration suppressing method for a supercharger, and a supercharger, capable of actualizing lowing noise while suppressing vibration of a housing with a simple way.

DETAILED DESCRIPTION

Embodiments of the present invention will now be described in detail with reference to the accompanying drawings. It is intended, however, that unless particularly identified, dimensions, materials, shapes, relative positions and the like of components described in the embodiments shall be interpreted as illustrative only and not intended to limit the scope of the present invention.

For example, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For example, an expression of an equal state such as "same", "equal" and "uniform" shall not be construed as indicating only the state in which the feature is strictly equal, but also includes a state in which there is a tolerance or a difference that can still achieve the same function.

Further, for example, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

In some cases, identical reference signs are given to identical configurations and description thereof is not repeated.

Figure 1:
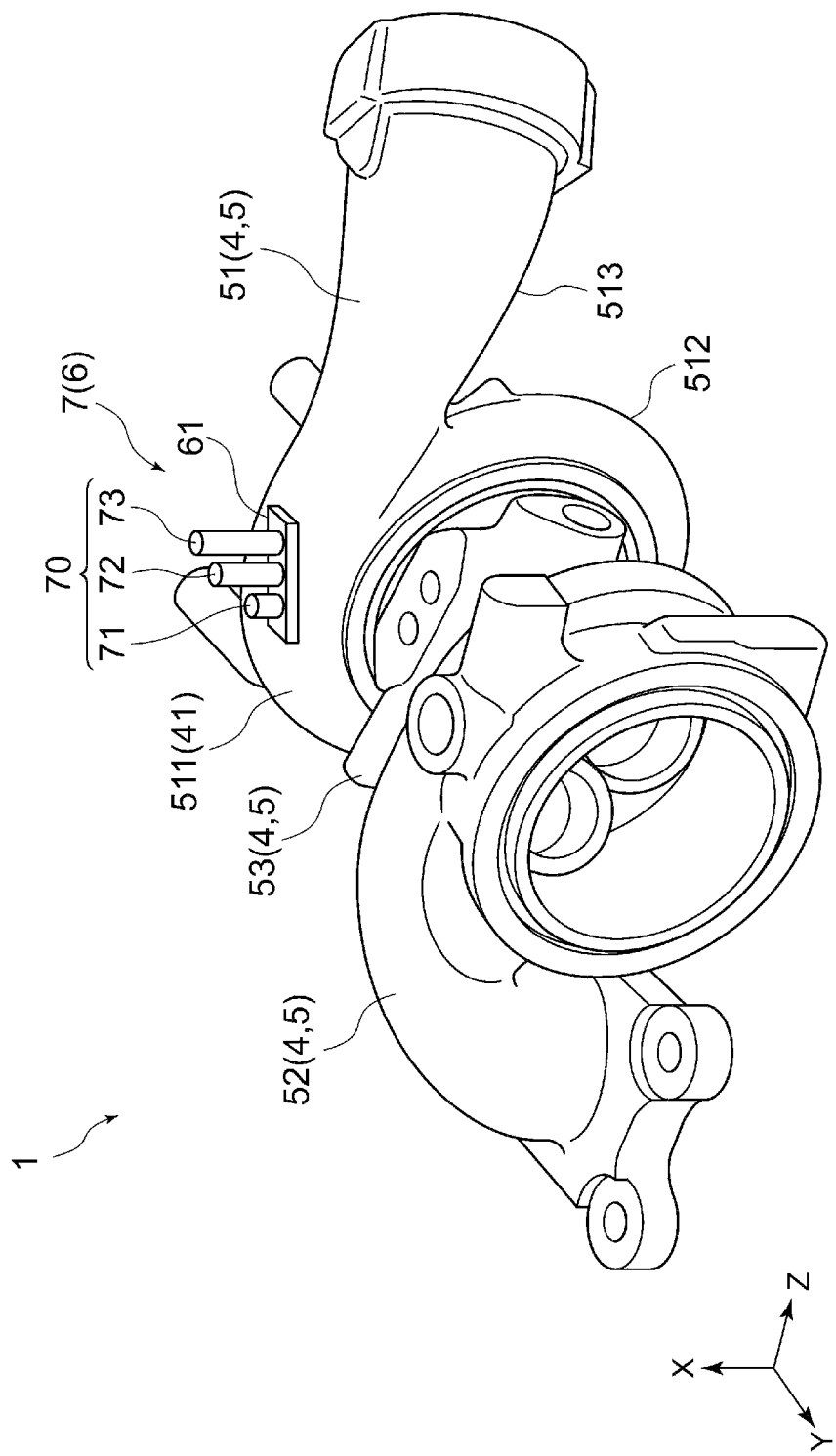
FIG. 1 is a schematic perspective view for explaining a vibration suppressing method for a supercharger according to an embodiment of the present invention, which illustrates a housing and a vibration suppressing unit of the supercharger.
Figure 2:
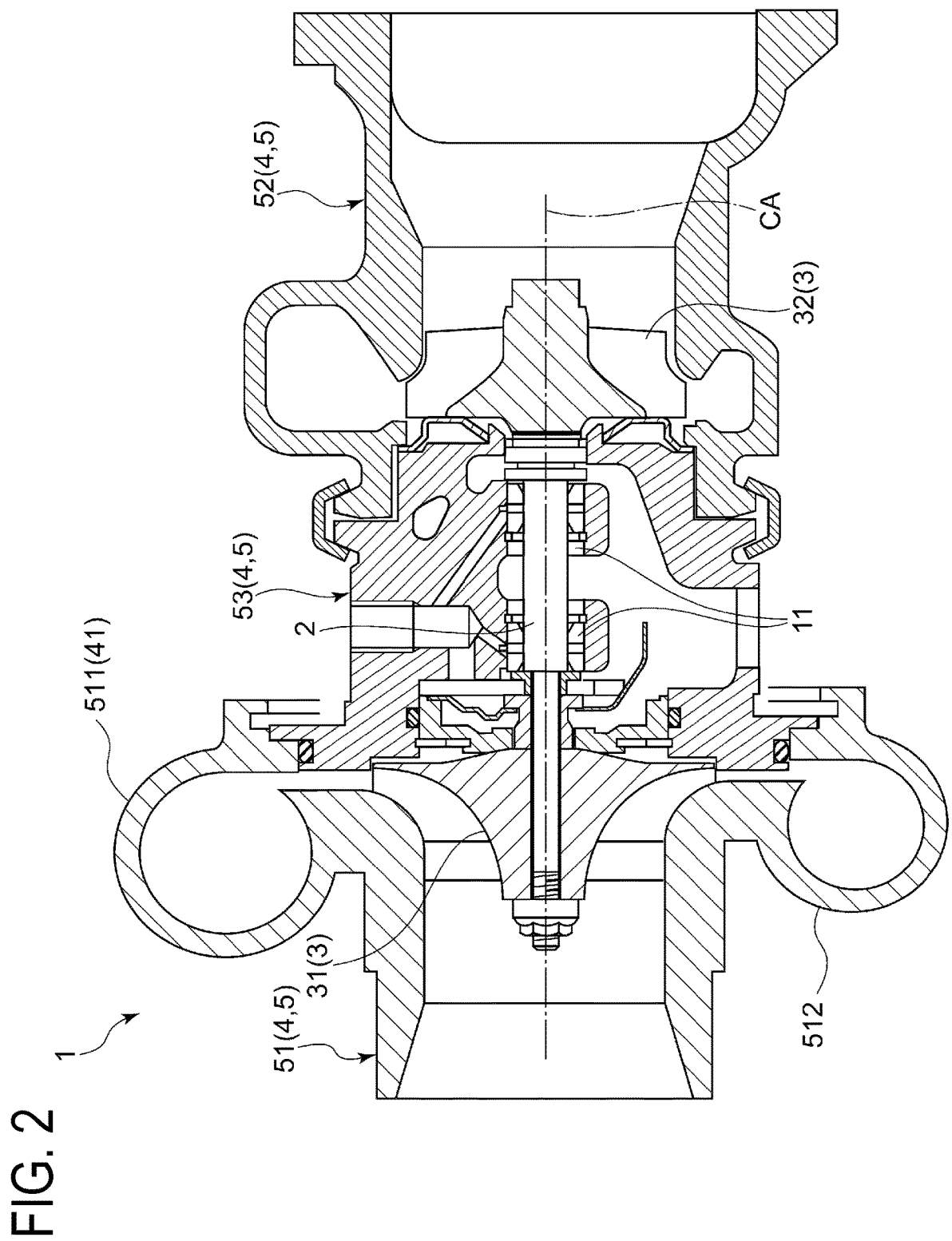
FIG. 2 is a schematic partial sectional view of the supercharger illustrated in FIG. 1 for explaining the inside of the housing of the supercharger.

FIG. 1 is a schematic perspective view for explaining a vibration suppressing method for a supercharger according to an embodiment of the present invention, which illustrates a housing and a vibration suppressing unit of the supercharger. FIG. 2 is a schematic partial sectional view of the supercharger illustrated in FIG. 1 for explaining the inside of the housing of the supercharger. As illustrated in FIG. 2, a supercharger 1 as a vibration suppression target of a vibration suppressing method 10 for a supercharger includes a shaft 2, a wheel 3 arranged at one end or the other end of the shaft 2, and a housing 4 including a wheel cover 5 accommodating the wheel 3.

In an embodiment illustrated in FIGS. 1 and 2, the supercharger 1 is a turbocharger. Specifically, as illustrated in FIG. 2, the wheel 3 of the supercharger 1 includes a compressor wheel 31 arranged at one end of the shaft 2 and a turbine wheel 32 arranged at the other end of the shaft 2. As illustrated in FIG. 2, the supercharger 1 further includes a bearing 11 rotatably supporting the shaft 2. Further, as illustrated in FIGS. 1 and 2, the housing 4 includes a compressor cover 51 accommodating the compressor wheel 31, a turbine cover 52 accommodating the turbine wheel 32, and a bearing cover 53 accommodating the bearing 11. As illustrated in FIG. 2, the bearing cover 53 is arranged between the compressor cover 51 and the turbine cover 52 and fixed to the compressor cover 51 and the turbine cover 52, for example, by screwing a bolt.

In the supercharger 1 (turbocharger), the turbine wheel 32 is rotated owing to that exhaust gas exhausted from an unillustrated engine (internal combustion engine) is supplied into and expanded in the turbine cover 52, as illustrated in FIG. 2. The compressor wheel 31 connected to the turbine wheel 32 through the shaft 2 is configured to be rotated in synchronization with the rotation of the turbine wheel 32, to compress combustion air (gas) for an engine in the compressor cover 51 into high density, and to forcibly feed compressed air into a combustion chamber of the engine.

Figure 3:
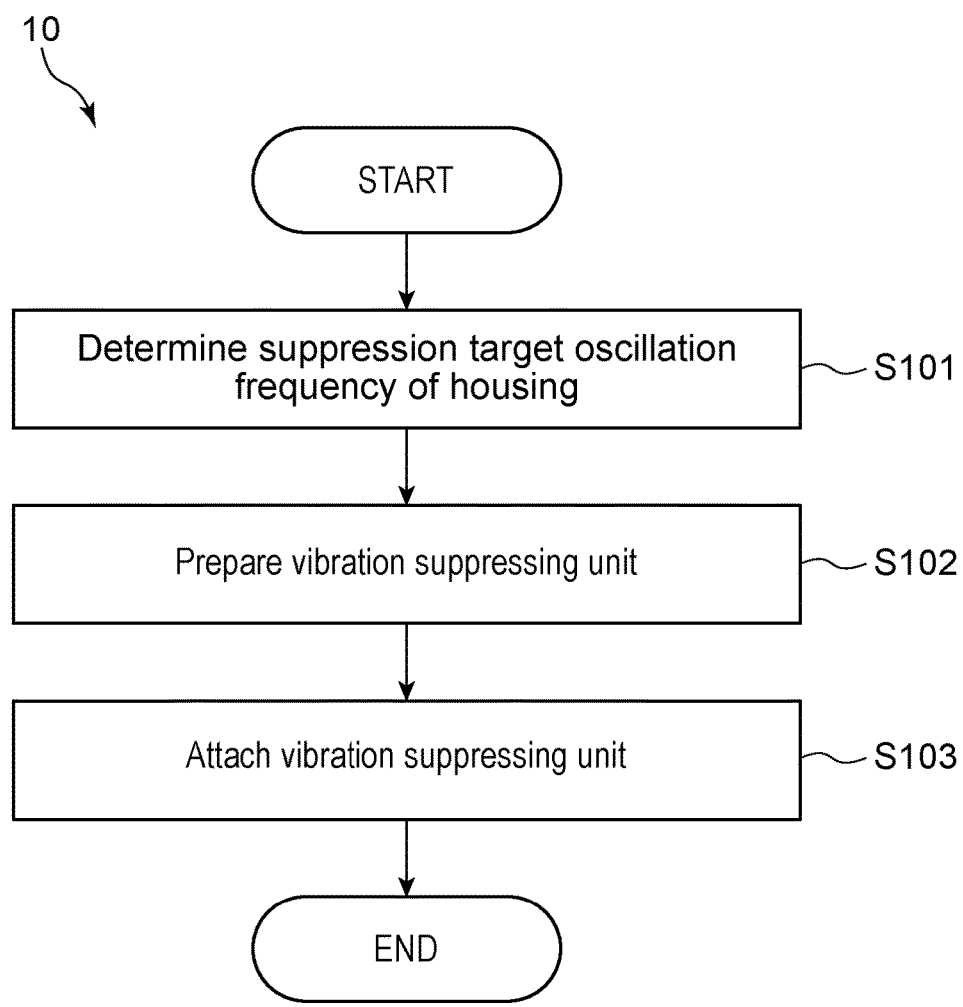
FIG. 3 is a flowchart illustrating an example of the vibration suppressing method for a supercharger according to an embodiment of the present invention.

FIG. 3 is a flowchart illustrating an example of the vibration suppressing method for a supercharger according to an embodiment of the present invention. A vibration suppressing method 10 for a supercharger is a method for suppressing vibration of the abovementioned supercharger 1, and as illustrated in FIG. 3, includes a determining step S101, a preparing step S102, and an attaching step S103.

Figure 4:
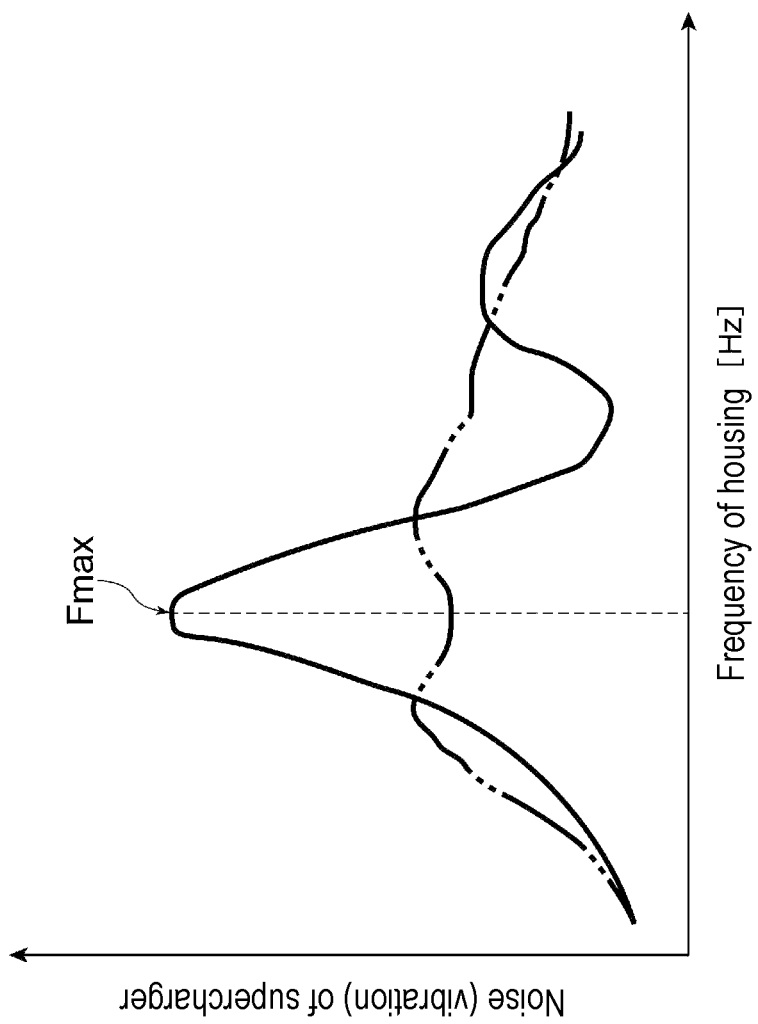
FIG. 4 is a graph illustrating a relation between vibration of a supercharger according to an embodiment of the present invention and an oscillation frequency of a housing for explaining a state before a vibration suppressing unit is attached and a state after the vibration suppressing unit is attached.

FIG. 4 is a graph illustrating a relation between vibration of a supercharger according to an embodiment of the present invention and an oscillation frequency of a housing for explaining a state before a vibration suppressing unit is attached and a state after the vibration suppressing unit is attached. As illustrated in FIG. 4, the supercharger 1 before a vibration suppressing unit 6 is attached largely vibrates at a predetermined oscillation frequency. In the determining step S101, suppression target oscillation frequency to be a suppression target is determined from among oscillation frequencies of the housing 4 to vibrate due to shaft vibration transmitted from the shaft 2. In the embodiment illustrated in FIG. 4, the maximum oscillation frequency Fmax of the housing 4 at which vibration of the supercharger 1 is maximized is set as the suppression target oscillation frequency.

In the determining step S101, it is also possible to acquire, before determining the suppression target oscillation frequency, information regarding vibration of the supercharger 1 to be a decision index for determining the suppression target oscillation frequency. The information regarding vibration of the supercharger 1 includes data on oscillation frequencies of the housing 4 and vibration of the supercharger 1 for each oscillation frequency, for example, as illustrated in FIG. 4.

In the preparing step S102, the vibration suppressing unit 6 having a natural frequency to be tuned in to the suppression target oscillation frequency is prepared. As illustrated in FIG. 1, the vibration suppressing unit 6 includes a dynamic damper device 7 including at least one damper member 70 to be attached onto an outer face 41 of the housing 4. The at least one damper member 70 is, as illustrated in FIG. 1, extended in a direction away from the housing 4 and has a natural frequency to be tuned in to vibration of the housing 4.

In the embodiment illustrated in FIG. 1, the dynamic damper device 7 includes a plurality of the damper members 70 (a first damper member 71, a second damper member 72, and a third damper member 73) and a base 61 supporting the damper members 70. As illustrated in FIG. 1, each of the damper members 70 is formed into a cylindrical shape extended along a direction (X direction in FIG. 1) perpendicular to the axial direction (Y direction in FIG. 1). The damper members 70 have natural frequencies respectively different from one another.

Figure 5:
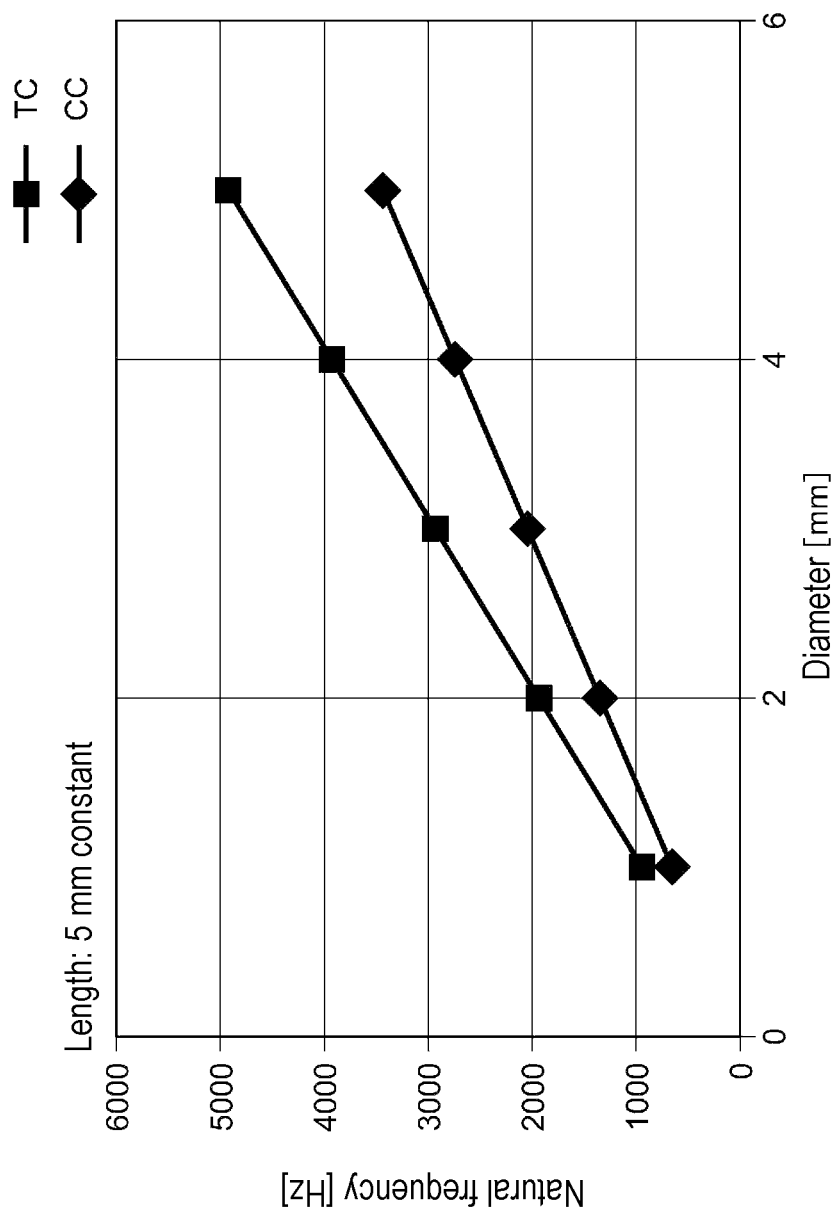
FIG. 5 is a graph illustrating a relation between a natural frequency and outer diameter of a damper member according to an embodiment of the present invention in a state that length of the damper member is set constant.
Figure 6:
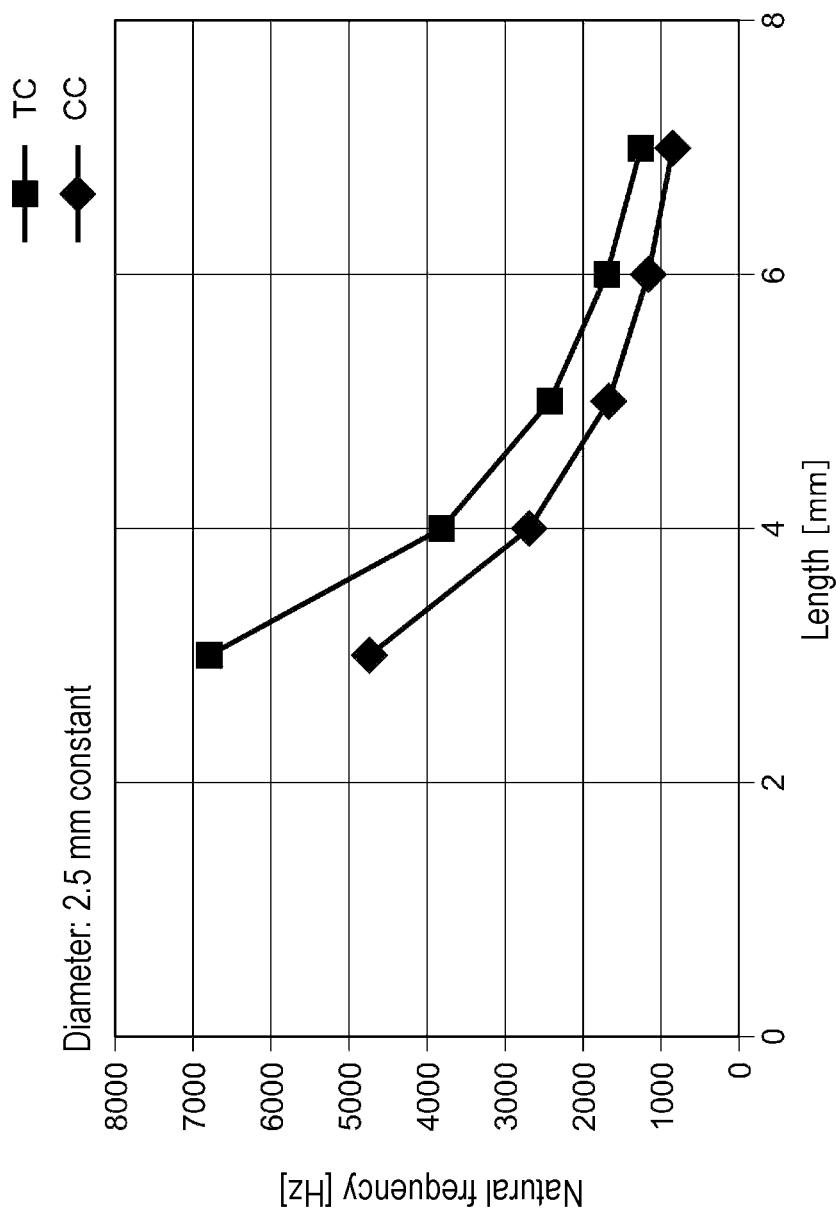
FIG. 6 is a graph illustrating a relation between a natural frequency and length of a damper member according to an embodiment of the present invention in a state that outer diameter of the damper member is set constant.

FIG. 5 is a graph illustrating a relation between a natural frequency and outer diameter of a damper member according to an embodiment of the present invention in a state that length of the damper member is set constant. FIG. 6 is a graph illustrating a relation between a natural frequency and length of a damper member according to an embodiment of the present invention in a state that outer diameter of the damper member is set constant. As illustrated in FIGS. 5 and 6, the natural frequency of the damper member 70 can be easily changed by changing length and/or outer diameter of the damper member 70. In FIGS. 5 and 6, CC corresponds to a damper member formed of a material same as the compressor cover and TC corresponds to a damper member formed of a material same as the turbine cover but different from the compressor cover. As illustrated in FIGS. 5 and 6, the natural frequency of the damper member 70 can be easily changed by changing a material of the damper member 70 as well.

In the preparing step S102, the damper member 70 having the natural frequency to be tuned in to the suppression target oscillation frequency of the housing 4 is selected from among damper members 70 having natural frequencies respectively different from one another due to different length, outer diameter, material, and the like and the dynamic damper device 7 including the damper member 70 is selected.

In the attaching step S103, the vibration suppressing unit 6 prepared in the preparing step S102 is attached onto the outer face 41 of the housing 4. Specifically, as illustrated in FIG. 1, the compressor cover 51 includes a main body section 512 accommodating the compressor wheel 31 and having a scroll flow path formed therein, and a pipe section 513 having a flow path in communication with the scroll flow path of the main body section 512 and being capable of supplying air compressed by the compressor wheel 31 to an unillustrated engine through the flow path. The pipe section 513 is extended in a direction away from the main body section 512. The vibration suppressing unit 6 is attached onto an outer face 511 of the main body section 512 of the compressor cover 51. In this case, compared to a case that the dynamic damper device 7 is attached onto an outer face of the pipe section 513, the vibration suppressing unit 6 can improve responsibility to vibration of the housing 4, so that vibration of the housing 4 can be effectively suppressed.

Figure 7:
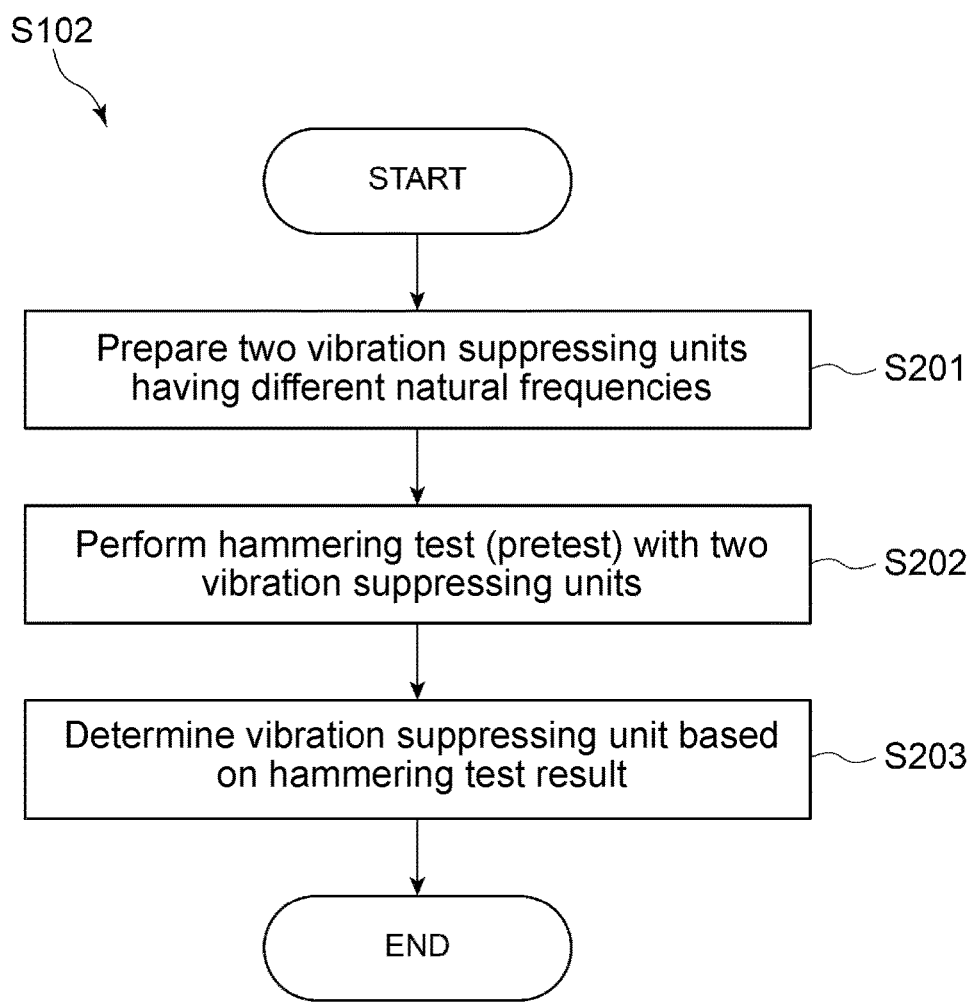
FIG. 7 is a flowchart illustrating an example of a preparing step in the vibration suppressing method for a supercharger according to an embodiment of the present invention.

FIG. 7 is a flowchart illustrating an example of a preparing step in the vibration suppressing method for a supercharger according to an embodiment of the present invention. Although suppression target oscillation frequency of the housing 4 may be calculated through analysis, the suppression target oscillation frequency acquired through analysis may be different from an actual measured value. Accordingly, in the embodiment illustrated in FIG. 7, the preparing step S102 includes a pretest preparing step S201 of preparing two vibration suppressing units 6 each having different natural frequencies, a pretest step S202 of performing a hammering test (pretest) with each of the vibration suppressing units 6 prepared in the pretest preparing step S201 attached separately to the housing 4, and a vibration suppressing unit determining step S203 of determining the vibration suppressing unit 6 based on a result of the hammering test using the two vibration suppressing units 6 described above. In this case, it is possible to reduce error between the natural frequency of the vibration suppressing unit 6 and the suppression target oscillation frequency of the housing 4, the vibration of which is to be suppressed by the vibration suppressing unit 6. In the pretest preparing step S201, a vibration suppressing unit 6 having a low natural frequency and a vibration suppressing unit 6 having a high natural frequency are prepared as the two vibration suppressing units 6. In this case, it is possible to perceive a trend of natural frequencies between the natural frequencies of the two vibration suppressing units 6.

Then, the vibration suppressing unit 6 determined in the vibration suppressing unit determining step S203 described above is attached onto the outer face of the housing 4 in the attaching step S103. Here, it is also possible to perform, after the vibration suppressing unit 6 is attached, a validation test whether the suppression target oscillation frequency of the housing 4 can be suppressed.

As described above, the vibration suppressing method 10 for a supercharger according to some embodiments includes the determining step S101, the preparing step S102, and the attaching step S103, as illustrated in FIG. 3. The supercharger 1 as a vibration suppression target of the vibration suppressing method 10 includes the shaft 2, the wheel 3, and the housing 4 including the wheel cover 5, as illustrated in FIG. 2.

According to the above method, since the supercharger 1 as the target of the vibration suppressing method includes the shaft 2, the wheel 3 arranged at one end or the other end of the shaft 2, and the housing 4 including the wheel cover 5 accommodating the wheel 3, the housing 4 vibrates during rotation of the shaft 2 with shaft vibration of the shaft 2 transmitted thereto. As a measure for the above, the vibration suppressing method 10 for a supercharger includes the determining step S101 of determining the suppression target oscillation frequency to be a suppression target from among oscillation frequencies of the housing 4, the preparing step S102 of preparing the vibration suppressing unit 6 having a natural frequency to be tuned in to the suppression target oscillation frequency, and the attaching step S103 of attaching the vibration suppressing unit 6 prepared in the preparing step S102 onto the outer face 41 of the housing 4. Thus, since the vibration suppressing unit 6 attached onto the outer face 41 of the housing 4 through the preparing step S102 and the attaching step S103 has a natural frequency to be tuned in to the suppression target oscillation frequency of the housing 4, the vibration suppressing unit 6 vibrates instead while absorbing vibration of the housing 4 at the suppression target oscillation frequency. Accordingly, it is possible to actualize lowering noise of the supercharger 1 while suppressing vibration of the housing 4.

In some embodiments, as illustrated in FIG. 1, the vibration suppressing unit 6 includes the dynamic damper device 7 including at least one damper member 70. In this case, vibration of the housing 4 can be suppressed by preparing, in the preparing step S102, the dynamic damper device 7 including at least one damper member 70 having a natural frequency to be tuned in to vibration of the housing 4, and attaching, in the attaching step S103, the dynamic damper device 7 onto the outer face 41 of the housing 4. Further, since the damper member 70 is attached onto the outer face 41 of the housing 4, ease of assembling is enhanced.

In some embodiments, as illustrated in FIGS. 1 and 2, the supercharger 1 includes the shaft 2, the wheel 3, the housing 4 including the wheel cover 5, and the dynamic damper device 7 including at least one damper member 70 described above.

According to the above configuration, since the supercharger 1 includes the shaft 2, the wheel 3 arranged at one end or the other end of the shaft 2, and the housing 4 including the wheel cover 5 accommodating the wheel 3, the housing 4 vibrates during rotation of the shaft 2 with shaft vibration of the shaft 2 transmitted thereto. As a measure for the above, the supercharger 1 includes the dynamic damper device 7 including the at least one damper member 70 to be attached onto the outer face 41 of the housing 4. The at least one damper member 70 of the dynamic damper device 7 is extended in a direction away from the housing 4 and has a natural frequency to be tuned in to vibration of the housing 4. Thus, since the damper member 70 attached onto the outer face 41 of the housing 4 has a natural frequency to be tuned in to the vibration of the housing 4, the damper member 70 vibrates instead while absorbing vibration of the housing 4. Accordingly, it is possible to actualize lowering noise of the supercharger 1 while suppressing vibration of the housing 4. Further, since the damper member 70 is attached onto the outer face 41 of the housing 4, ease of assembling is enhanced.

In some embodiments, the dynamic damper device 7 includes the plurality of damper members 70 and the damper members 70 have natural frequencies respectively different from one another. In this case, since the dynamic damper device 7 can cause the damper members 70 each having different natural frequencies to be tuned in respectively to a plurality of oscillation frequencies of the housing 4, vibration of the housing 4 can be effectively suppressed.

Figure 8:
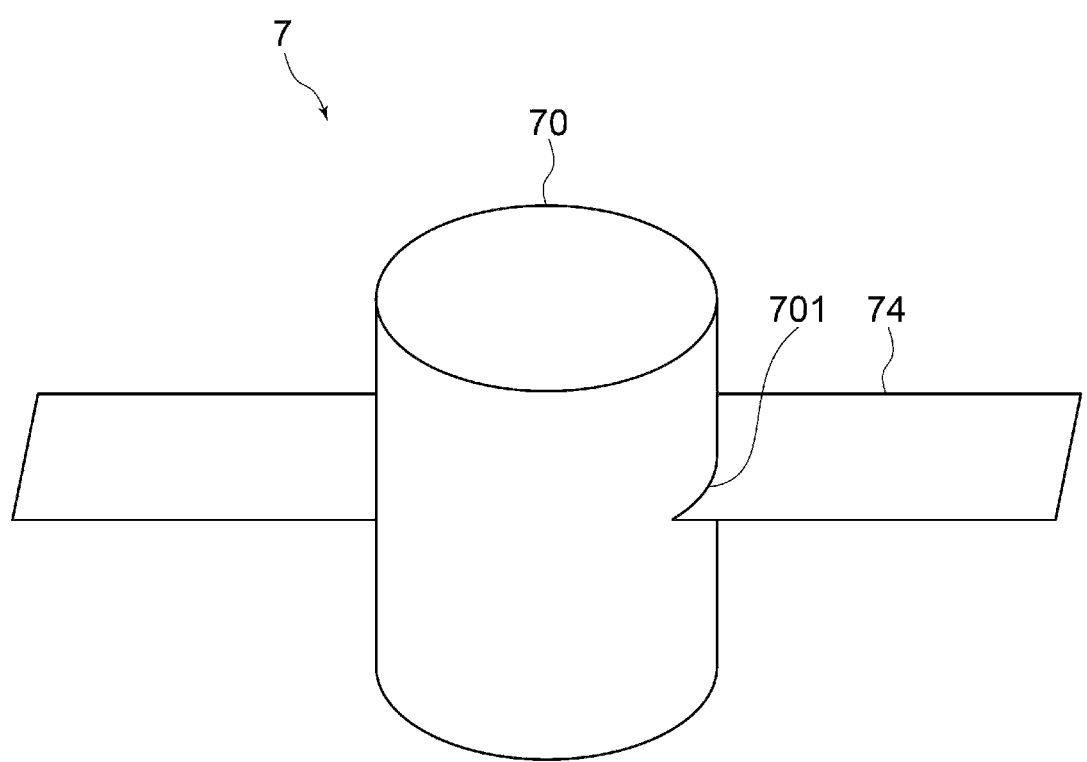
FIG. 8 is a perspective view illustrating a damper member according to another embodiment of the present invention.

FIG. 8 is a perspective view illustrating a damper member according to another embodiment of the present invention. As illustrated in FIG. 8, in some embodiments, the dynamic damper device 7 further includes a plate-shaped elastic member 74 attached to the at least one damper member 70 in a removably attachable manner. In the embodiment illustrated in FIG. 8, the damper member 70 has a through-hole 701 penetrating at a lengthwise midpoint in a direction perpendicular to an extending direction of the damper member 70. The elastic member 74 is inserted to the through-hole 701 and extended along the direction perpendicular to the extending direction of the damper member 70. In this case, the natural frequency of the damper member 70 can be easily adjusted by changing the elastic member 74 to be attached to the damper member 70 with another elastic member 74 having different dimensions, shapes, and the like.

Figure 9:
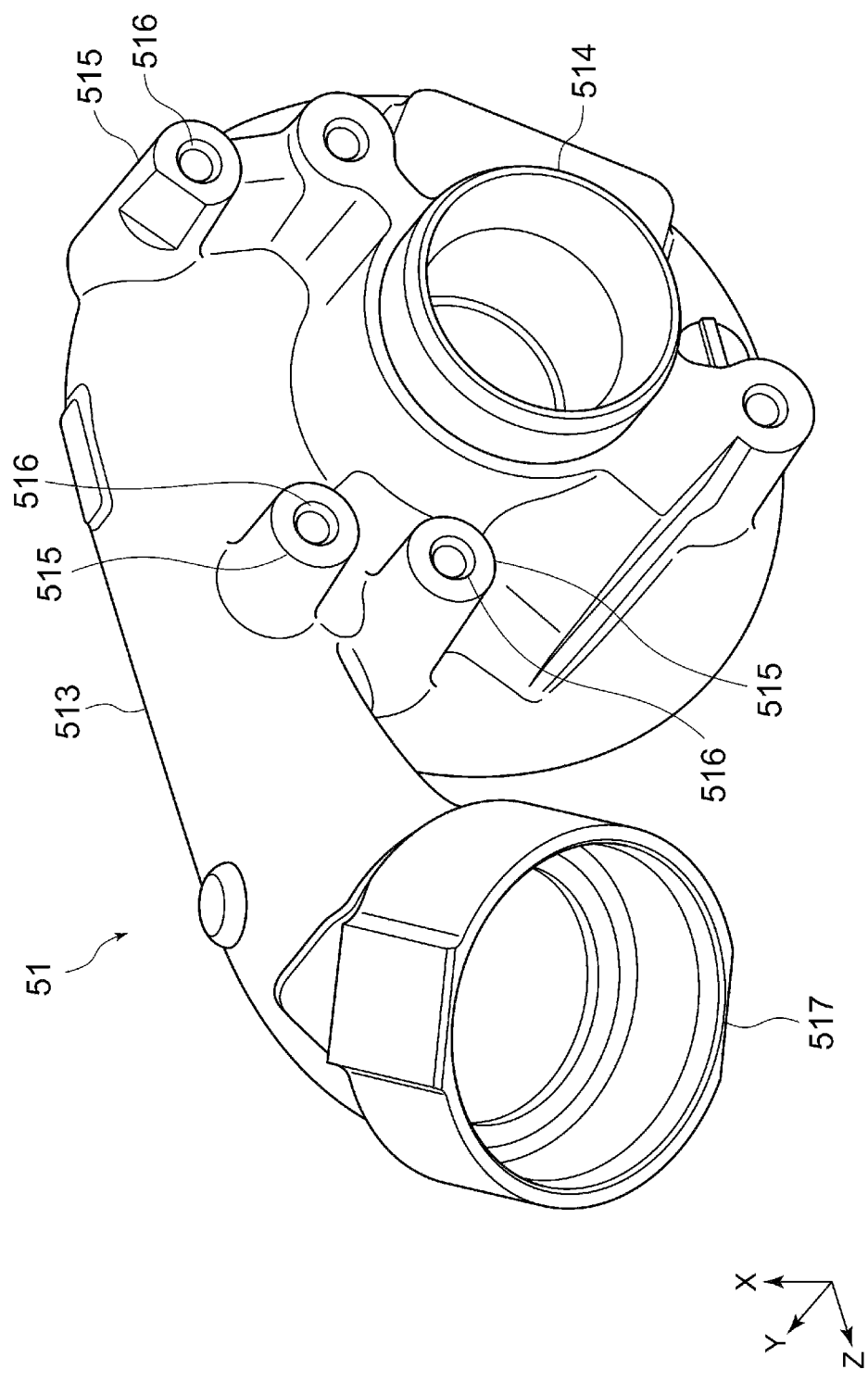
FIG. 9 is a perspective view illustrating a compressor cover according to another embodiment of the present invention in a state before an actuator is attached.
Figure 10:
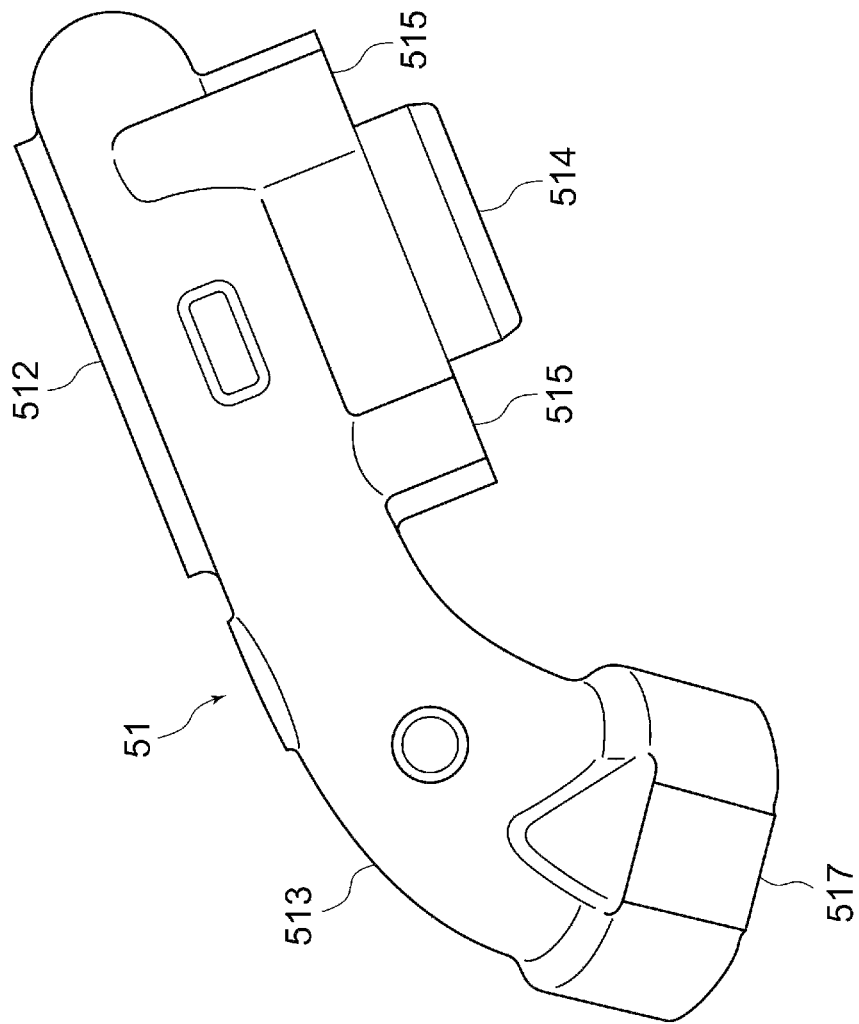
FIG. 10 is a perspective view illustrating the compressor cover illustrated in FIG. 9 viewed in a direction different from that in FIG. 9.
Figure 11:
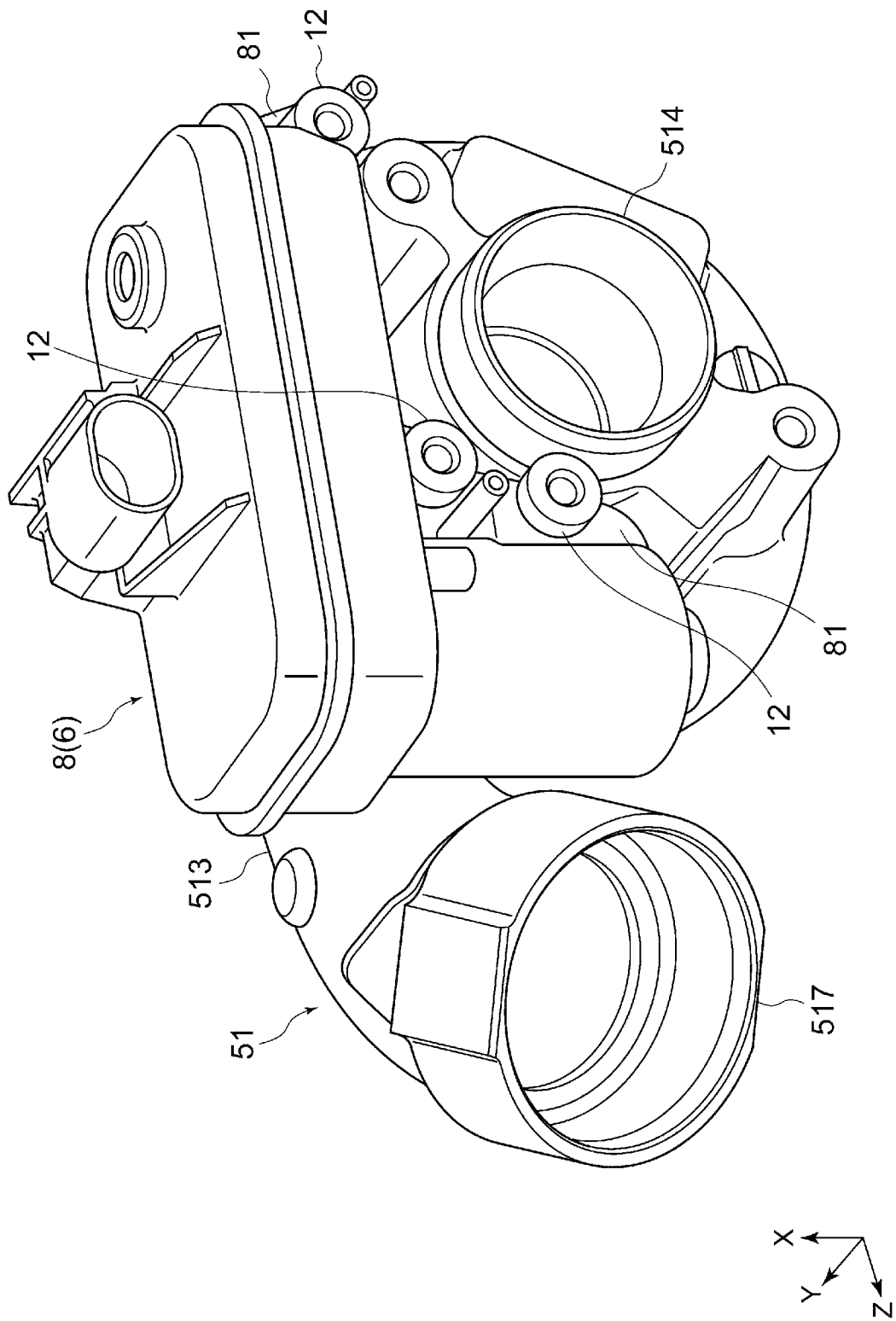
FIG. 11 is a perspective view illustrating a compressor cover according to another embodiment of the present invention in a state after an actuator is attached.

FIG. 9 is a perspective view illustrating a compressor cover according to another embodiment of the present invention in a state before an actuator is attached. FIG. 10 is a perspective view illustrating the compressor cover illustrated in FIG. 9 viewed in a direction different from that in FIG. 9. FIG. 11 is a perspective view illustrating a compressor cover according to another embodiment of the present invention in a state after an actuator is attached.

In some embodiments, as illustrated in FIG. 3, the vibration suppressing method 10 for a supercharger includes the determining step S101, the preparing step S102, and the attaching step S103. Further, as illustrated in FIG. 2, the supercharger 1 as a vibration suppression target of the vibration suppressing method 10 includes the shaft 2, the wheel 3, and the housing 4 including the wheel cover 5. Further, as illustrated in FIG. 11, the vibration suppressing unit 6 includes an actuator 8 attached onto the outer face 41 of the housing 4 with a bolt 12.

As illustrated in FIG. 9, the main body section 512 of the compressor cover 51 includes an air-intake port 514, at one end thereof in the axial direction (Y direction in FIG. 9), through which air is supplied to the compressor wheel 31. Further, as illustrated in FIG. 9, the pipe section 513 of the compressor cover 51 includes an inlet port 517 at the other end opposite to the one end being in communication with the main body section 512. Further, as illustrated in FIG. 9, bosses 515 being three in total are arranged at the main body section 512 and the pipe section 513 of the compressor cover 51 as being extended outward in the axial direction from one end side where the air-intake port 514 is arranged. A female screw portion 516 is formed at each of the bosses 515.

The actuator 8 is a device for driving a variable mechanism such as an unillustrated variable vane, an unillustrated weight gate valve, and the like, for example in a variable capacity turbocharger. As illustrated in FIG. 11, the actuator 8 is attached onto an outer face 511 of the compressor cover 51. Specifically, the actuator 8 includes a plate-shaped fixing portion 81 at a position corresponding to the boss 515 of the compressor cover 51. The fixing portion 81 of the actuator 8 is extended along a direction perpendicular to the axial direction and has an unillustrated through-hole or an unillustrated cutout penetrating along the axial direction. Owing to that a male screw portion of the bolt 12 is inserted to the unillustrated through-hole or the unillustrated cutout of the fixing portion 81 of the actuator 8 and screwed with the female screw portion 516 of the boss 515, the compressor cover 51 and the actuator 8 are fixed to each other. At that time, the fixing portion 81 of the compressor cover 51 is interposed between the boss 515 and a head section of the bolt 12.

A natural frequency of the actuator 8 can be changed by changing stiffness at the fixing portion 81. Specifically, examples of the above include changing length of the boss 515 in an extending direction thereof, changing plate thickness of the fixing portion 81 of the actuator 8, and changing thread diameter of the male screw portion of the bolt 12 and the female screw portion 516 of the boss 515. Thus, the actuator 8 is adjusted to have a desirable natural frequency by combining such changeable elements.

Figure 12:
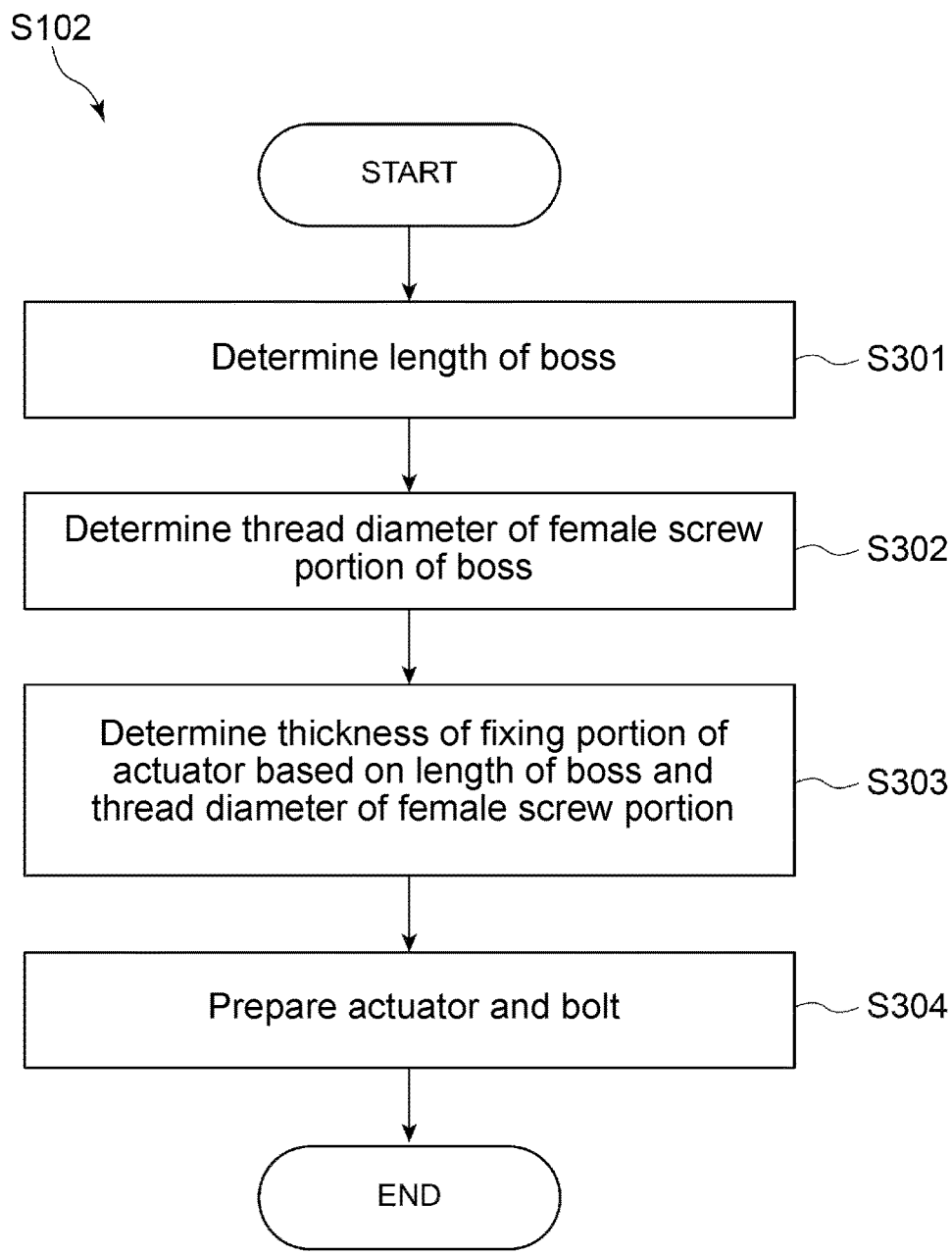
FIG. 12 is a flowchart illustrating an example of a preparing step in the vibration suppressing method for a supercharger according to another embodiment of the present invention.

FIG. 12 is a flowchart illustrating an example of a preparing step in the vibration suppressing method for a supercharger according to another embodiment of the present invention. In the embodiment illustrated in FIG. 12, the preparing step S102 includes a step S301 of determining length of the boss 515, a step S302 of determining thread diameter of the female screw portion 516 of the boss 515, a step S303 of determining thickness of the fixing portion 81 of the actuator 8 based on the length of the boss 515 and the thread diameter of the female screw portion 516 determined respectively in the steps S301 and S302 to obtain a desirable natural frequency, and a step S304 of preparing the actuator 8 including the fixing portion 81 having the thickness determined in the step S303 and the bolt 12 corresponding to the thread diameter of the female screw portion 516 determined in the step S302. In another embodiment, to obtain a desirable natural frequency, the thread diameter of the female screw portion 516 may be determined based on the length of the boss 515 and the thickness of the fixing portion 81 of the actuator 8, or the length of the boss 515 may be determined based on the thread diameter of the female screw portion 516 and the thickness of the fixing portion 81 of the actuator 8.

According to the above method, as illustrated in FIG. 2, owing to that the actuator 8 having a natural frequency to be tuned in to vibration of the housing 4 is prepared in the preparing step S102 and the actuator 8 is attached onto the outer face 41 of the housing 4 with the bolt 12 in the attaching step S103, vibration of the housing 4 can be suppressed. Further, being different from the dynamic damper device 7, the actuator 8 is not a component additionally attached to the housing 4, so that increase in part count of the supercharger 1 can be prevented.

Figure 13:
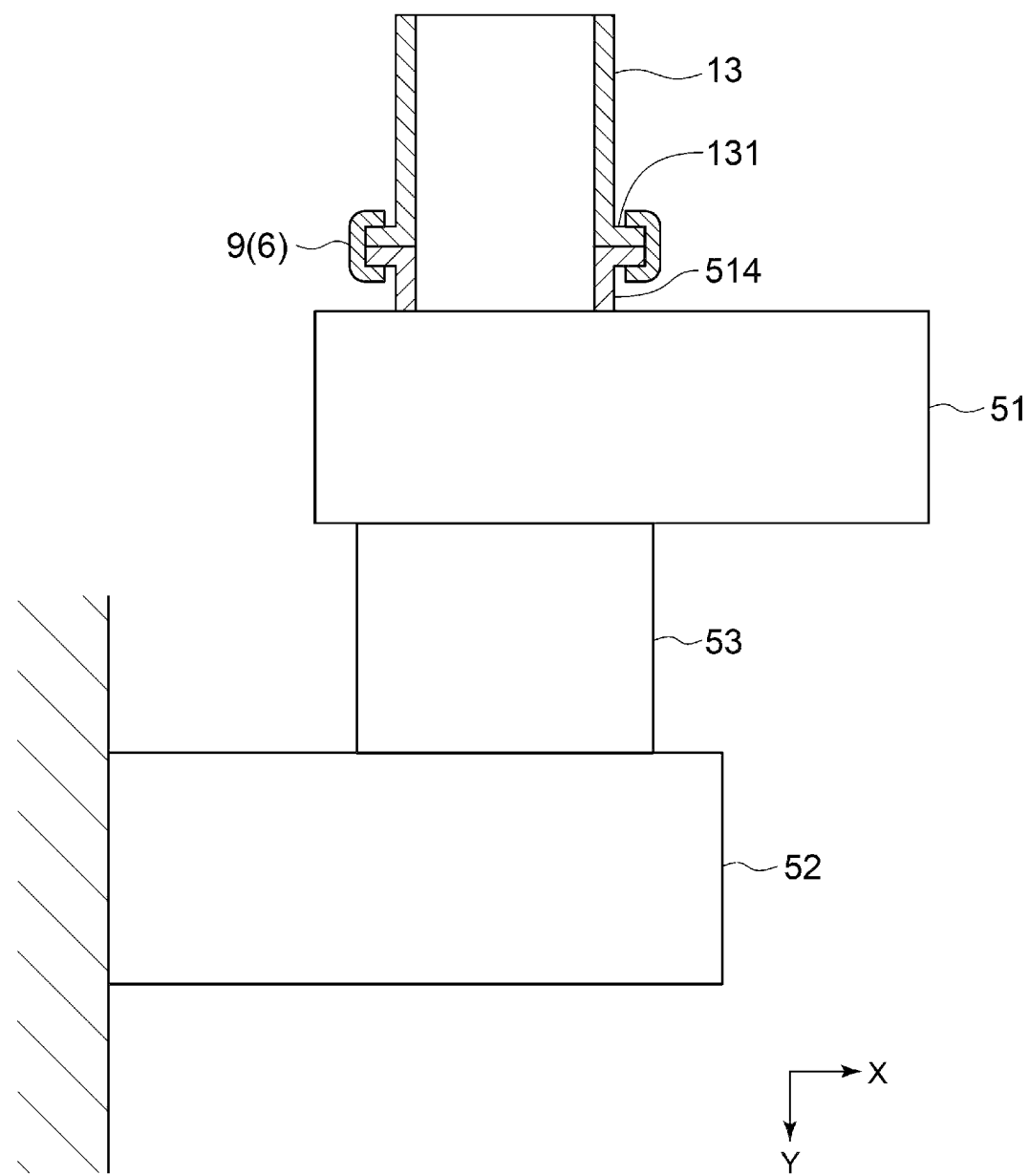
FIG. 13 is a schematic view schematically illustrating a configuration of a supercharger according to another embodiment of the present invention for explaining a piping joint attached onto an outer face of a wheel cover.

FIG. 13 is a schematic view schematically illustrating a configuration of a supercharger according to another embodiment of the present invention for explaining a piping joint attached onto an outer face of a wheel cover. In some embodiments, as illustrated in FIG. 3, the vibration suppressing method 10 for a supercharger includes the determining step S101, the preparing step S102, and the attaching step S103. Further, as illustrated in FIG. 2, the supercharger 1 as a vibration suppression target of the vibration suppressing method 10 includes the shaft 2, the wheel 3, and the housing 4 including the wheel cover 5. Further, as illustrated in FIG. 13, the vibration suppressing unit 6 includes the piping joint 9 attached to a connection section between the housing 4 and a connecting pipe 13 to be connected to the housing 4. A natural frequency of the piping joint 9 can be changed by changing weight of the piping joint 9.

In the embodiment illustrated in FIG. 13, the piping joint 9 is attached to the connection section between the air-intake port 514 of the compressor cover 51 and the connecting pipe 13. As illustrated in FIG. 13, the piping joint 9 is configured to interpose and fix the air-intake port 514 of the compressor cover 51 and the connecting pipe 13 by being fitted, from the outside, to a flange section formed at an end of the air-intake port 514 of the compressor cover 51 and a flange section 131 formed at an end of the connecting pipe 13 with the flanges being in contact to each other. Here, the piping joint 9 may include a shaft joint (coupling), a union joint, or the like. In another embodiment, the piping joint 9 may be attached to a connection section between the inlet port 517 of the compressor cover 51 and a connecting pipe.

According to the above method, owing to that the piping joint 9 having a natural frequency to be tuned in to vibration of the housing 4 is prepared in the preparing step S102 and the piping joint 9 is attached to the connection section between the housing 4 and the connecting pipe 13 in the attaching step S103, vibration of the housing 4 can be suppressed. Further, being different from the dynamic damper device 7, the piping joint 9 is not a component additionally attached to the housing 4, so that increase in part count of the supercharger 1 can be prevented.

In the vibration suppressing method 10 for a supercharger and the supercharger 1 in some embodiments, as illustrated in FIG. 2, the wheel 3 includes the compressor wheel 31 arranged at one end of the shaft 2 and the wheel cover 5 includes the compressor cover 51 accommodating the compressor wheel 31. The housing 4 further includes the bearing cover 53 accommodating the bearing 11 rotatably supporting the shaft 2. As illustrated in FIG. 1, the vibration suppressing unit 6 is attached onto the outer face 511 of the compressor cover 51.

According to the above configuration and method, since the shaft 2 is rotatably supported by the bearing 11, the shaft 2 rotationally swings, during rotation of the shaft 2, more at the end thereof where the compressor wheel 31 is arranged than a section thereof supported by the bearing 11. Accordingly, the compressor cover 51 accommodating the compressor wheel 31 is to vibrate more than the bearing cover 53 accommodating the bearing 11. Here, owing to that the vibration suppressing unit 6 is attached onto the outer face 511 of the compressor cover 51, vibration of the housing 4 can be effectively suppressed.

Further, in the vibration suppressing method 10 for a supercharger and the supercharger 1 in some embodiments, as illustrated in FIG. 2, the wheel 3 further includes the turbine wheel 32 and the wheel cover 5 includes the turbine cover 52 accommodating the turbine wheel 32. In this case, the supercharger 1 as a vibration suppression target is a turbocharger including the compressor wheel 31 and the turbine wheel 32. Since the compressor wheel 31 is lighter than the turbine wheel 32 in a turbocharger, the shaft 2 supported by the bearing 11 rotationally swings, during rotation thereof more on the compressor wheel 31 side than on the turbine wheel 32 side. Accordingly, the compressor cover 51 accommodating the compressor wheel 31 is to vibrate more than the turbine cover 52 accommodating the turbine wheel 32. Here, owing to that the vibration suppressing unit 6 is attached onto the outer face 511 of the compressor cover 51 vibration of the housing 4 can be effectively suppressed.

Not limited to the embodiments described above, the present invention includes various amendments and modifications of the embodiments and appropriate combinations thereof.

REFERENCE SIGNS LIST

1 Supercharger
10 Vibration suppressing method for supercharger
2 Shaft
3 Wheel
31 Compressor wheel
32 Turbine wheel
4 Housing
41 Outer face
5 Wheel cover
51 Compressor cover
511 Outer circumferential face
512 Main body section
513 Pipe section
514 Air-intake port
515 Boss 516 Female screw portion
517 Inlet port
52 Turbine cover
53 Bearing cover
6 Vibration suppressing unit
61 Base
7 Dynamic damper device
70 Damper member
701 Through-hole
71 First damper member
72 Second damper member
73 Third damper member
74 Elastic member
8 Actuator
81 Fixing portion
9 Piping joint
11 Bearing
12 Bolt
13 Connecting pipe

The invention claimed is:

1. A vibration suppressing method for a supercharger, the supercharger comprising a shaft, a wheel arranged at one end or the other end of the shaft, and a housing including a wheel cover accommodating the wheel, the method comprising:
   a determining step of determining a suppression target oscillation frequency to be a suppression target from among oscillation frequencies of the housing vibrating with shaft vibration of the shaft transmitted thereto;
   a preparing step of preparing a vibration suppressing unit having a natural frequency to be tuned in to the suppression target oscillation frequency;
   an attaching step of attaching the vibration suppressing unit prepared in the preparing step onto an outer face of the housing,
   wherein the vibration suppressing unit includes a dynamic damper device including at least one damper member to be attached onto the outer face of the housing, the damper member being extended in a direction away from the housing and having a natural frequency to be tuned in to vibration of the housing, and
   the preparing step includes a step of performing a hammering test with two vibration suppressing units each having different natural frequencies attached to the housing, and a step of determining the vibration suppressing unit based on a result of the hammering test.

2. The vibration suppressing method for a supercharger according to claim 1,
   wherein the wheel includes a compressor wheel arranged at the one end of the shaft,
   the wheel cover includes a compressor cover accommodating the compressor wheel,
   the housing further includes a bearing cover accommodating a bearing rotatably, supporting the shaft, and
   the vibration suppressing unit is attached onto an outer face of the compressor cover.

3. The vibration suppressing method for a supercharger according to claim 2,
   wherein the wheel includes a turbine wheel arranged at the other end of the shaft, and
   the wheel cover includes a turbine cover accommodating the turbine wheel.

4. A vibration suppressing method for a supercharger, the supercharger comprising a shaft, a wheel arranged at one end or the other end of the shaft, and a housing including a wheel cover accommodating the wheel, the method comprising:
   a determining step of determining a suppression target oscillation frequency to be a suppression target from among oscillation frequencies of the housing vibrating with shaft vibration of the shaft transmitted thereto;
   a preparing step of preparing a vibration suppressing unit having a natural frequency to be tuned in to the suppression target oscillation frequency;
   an attaching step of attaching the vibration suppressing unit prepared in the preparing step onto an outer face of the housing,
   wherein the vibration suppressing unit includes an actuator attached onto the outer face of the housing with a bolt,
   the housing includes a boss having a female screw portion to which the bolt is capable of being screwed,
   the actuator includes a plate-shaped fixing portion arranged at a position corresponding to the boss of the housing and having a through-hole or a cutout to which the bolt is inserted, and
   the preparing step includes a step of determining length of the boss, a step of determining thread diameter of the female screw portion, and a step of determining thickness of the fixing portion.

5. A vibration suppressing method for a supercharger, the supercharger comprising a shaft, a wheel arranged at one end or the other end of the shaft, and a housing including a wheel cover accommodating the wheel, the method comprising:
   a determining step of determining a suppression target oscillation frequency to be a suppression target from among oscillation frequencies of the housing vibrating with shaft vibration of the shaft transmitted thereto;
   a preparing step of preparing a vibration suppressing unit having a natural frequency to be tuned in to the suppression target oscillation frequency;
   an attaching step of attaching the vibration suppressing unit prepared in the preparing step onto an outer face of the housing, and
   wherein the vibration suppressing unit includes a piping joint attached to a connection section between the housing and a connecting pipe to be connected to the housing.

6. A supercharger, comprising:
   a shaft;
   a wheel arranged at one end or the other end of the shaft;
   a housing including a wheel cover accommodating the wheel;
   a dynamic damper device including at least one damper member to be attached onto an outer face of the housing, the damper member being extended in a direction away from the housing and having a natural frequency to be tuned in to vibration of the housing, and
   wherein the dynamic damper device further includes a plate-shaped elastic member attached to the at least one damper member in a removably attachable manner.

7. The supercharger according to claim 6,
   wherein the dynamic damper device includes a plurality of the damper members, and
   the damper members have natural frequencies respectively different from one another.

8. The supercharger according to claim 6,
   wherein the wheel includes a compressor wheel arranged at the one end of the shaft,
   the wheel cover includes a compressor cover accommodating the compressor wheel, the housing further includes a beating cover accommodating a bearing rotatably supporting the shaft, and the dynamic damper device is attached onto an outer face of the compressor cover.

9. The supercharger according to claim 8, wherein the wheel includes a turbine wheel arranged at the other end of the shaft, and the wheel cover includes a turbine cover accommodating the turbine wheel.

10. The supercharger according to claim 6, wherein the at least one damper member has a through-hole penetrating in a direction perpendicular to an extending direction of the at least one damper member, and the plate-shaped elastic member is inserted to the through-hole of the at least one damper member and extended in the direction perpendicular to the extending direction.

\* \* \* \* \*